(12) United States Patent
Hirakata et al.

(10) Patent No.: US 6,556,264 B1
(45) Date of Patent: Apr. 29, 2003

(54) METHOD OF MANUFACTURING AN ACTIVE MATRIX-TYPE LIQUID CRYSTAL DEVICE USING A SEMICONDUCTOR THIN FILM HAVING AN ORGANIC RESIN INTERLAYER INSULATING FILM

(75) Inventors: Yoshiharu Hirakata, Kanagawa (JP); Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/064,176

(22) Filed: Apr. 22, 1998

(30) Foreign Application Priority Data

Apr. 25, 1997 (JP) .............................. 9-123001

(51) Int. Cl.⁷ .......................................... G02F 1/1333
(52) U.S. Cl. ......................... 349/110; 438/30; 349/138
(58) Field of Search ................. 349/110, 122, 349/138; 257/57, 72; 438/30

(56) References Cited

U.S. PATENT DOCUMENTS

| 5,117,299 A | | 5/1992 | Kondo et al. | |
|---|---|---|---|---|
| 5,132,676 A | | 7/1992 | Kimura et al. | |
| 5,240,801 A | | 8/1993 | Hayashi et al. | |
| 5,330,616 A | | 7/1994 | Yamazaki | |
| 5,583,369 A | | 12/1996 | Yamazaki et al. | |
| 5,592,318 A | * | 1/1997 | Majima et al. | 349/122 |
| 5,652,667 A | * | 7/1997 | Kurogane | 349/42 |
| 5,706,067 A | * | 1/1998 | Colgan et al. | 349/114 |
| 5,739,890 A | * | 4/1998 | Uda et al. | 349/156 |
| 5,754,263 A | * | 5/1998 | Akiyama et al. | 349/110 |
| 5,757,054 A | * | 5/1998 | Miyawaki et al. | 257/300 |
| 5,767,827 A | * | 6/1998 | Kobayashi et al. | 345/87 |
| 5,910,271 A | * | 6/1999 | Ohe et al. | 349/19 |
| 5,933,204 A | * | 8/1999 | Fukumoto | 349/43 |
| 5,946,561 A | | 8/1999 | Yamazaki et al. | |
| 5,949,107 A | | 9/1999 | Zhang | |
| 6,008,876 A | * | 12/1999 | Moore | 349/139 |
| 6,037,197 A | | 3/2000 | Yamazaki et al. | |
| 6,049,132 A | * | 4/2000 | Iwahashi et al. | 257/763 |

* cited by examiner

*Primary Examiner*—Kenneth Parker
(74) *Attorney, Agent, or Firm*—Eric J. Robinson; Robinson Intellectual Property Law Office, P.C.

(57) ABSTRACT

To provide an active matrix type liquid crystal display device having fine display performance, an interlayer insulating film 104 covering TFTs 102, 103 formed on a substrate 101 is first flattened by mechanical polishing typified by a CMP. Then pixel electrodes 106, 107 are formed thereon, and further, an insulating layer 108 covering the pixel electrodes is formed. And then, the insulating layer 108 is flattened by second mechanical polishing so that the surfaces of the pixel electrodes and the surface of the insulating layers 112, 113 form the same plane. By this, a difference in level disappears, and it is possible to prevent lowering of contrast or the like due to poor orientation of a liquid crystal material, diffused reflection of light, and the like.

21 Claims, 12 Drawing Sheets

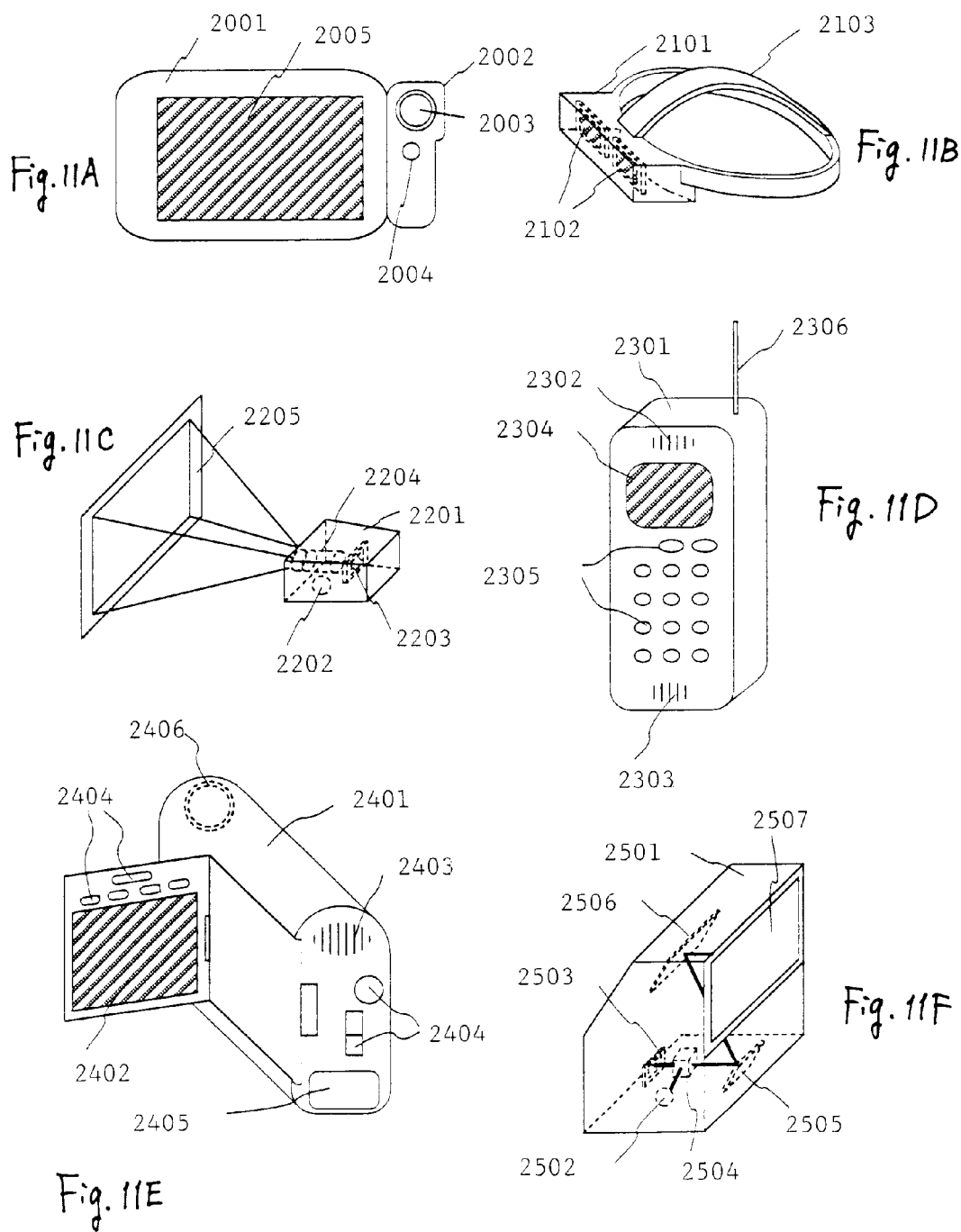

reflection surface

METHOD OF MANUFACTURING AN ACTIVE MATRIX-TYPE LIQUID CRYSTAL DEVICE USING A SEMICONDUCTOR THIN FILM HAVING AN ORGANIC RESIN INTERLAYER INSULATING FILM

BACKGROUND OF THE INVENTION

1. Field of the Invention

The present invention relates to a method of manufacturing a liquid crystal display device (LCD), and particularly to a method of manufacturing an active matrix type liquid crystal display device using a semiconductor thin film (hereinafter referred to as an AM-LCD). The present invention can be applied to an electrooptical device equipped with such a display device.

Incidentally, in the present specification, the term "semiconductor device" indicates all devices which function by using a semiconductor. Thus, the foregoing display device and the electrooptical device are included in the category of the semiconductor device. However, in the present specification, for facilitation of the distinction, terms such as a display device and an electrooptical device are selectively used.

2. Description of the Related Art

In recent years, a projector or the like using the AM-LCD as a projection type display has been vigorously developed. Moreover, the demand of the AM-LCD as a direct viewing display for a mobile computer or a video camera is also increasing.

FIGS. 2A and 2B schematically shows a structure of a pixel matrix circuit in a conventional active matrix type display device. Incidentally, the pixel matrix circuit is such a circuit that thin film transistors (TFTs) for controlling an electric field applied to a liquid crystal are arranged in matrix, and constitutes a picture image display region of the AM-LCD.

FIG. 2A is a top view showing the pixel matrix circuit seen from the above. Here, regions surrounded by a plurality of gate lines 201 provided in the horizontal direction and a plurality of source lines 202 provided in the vertical direction become pixel regions. A TFT 203 is formed at each of the intersections of the plurality of gate lines 201 and the plurality of source lines 202. A pixel electrode 204 is connected to each of the TFTs.

Thus, the pixel matrix circuit is constituted by the plurality of pixel regions formed in matrix by being surrounded by the plurality of gate lines 201 and the plurality of source lines 202, and the TFT 203 and the pixel electrode 204 are provided at each of the pixel regions.

FIG. 2B shows the structure of a section of the pixel matrix circuit. In FIG. 2B, reference numeral 205 denotes a substrate having an insulating surface, 206 and 207 denote pixel TFTs formed on the substrate 205, which correspond to the TFTs 203 shown in FIG. 2A.

The pixel TFTs 206 and 207 are connected to pixel electrodes 208 and 209, respectively. The pixel electrodes 208 and 209 correspond to the pixel electrodes 204 shown in FIG. 2A. The pixel electrodes 208 and 209 are generally obtained by patterning one metal thin film.

Thus, in the pixel matrix circuit of the conventional structure, boundary portions of electrodes (hereinafter simply referred to as boundary portions) 210 and 211 always exist between the pixel electrodes. That is, a difference in level, which corresponds to the film thickness of the pixel electrode, is inevitably formed. Poor orientation of a liquid crystal material occurs at such a difference in level, so that a displayed picture is disturbed. Besides, diffused reflection of incident light at the portion of the difference in level causes the contrast to lower or the efficiency of utility of light to lower.

As is apparent from FIG. 2B, the pixel electrodes 208 and 209 formed over the semiconductor elements or the intersections of the respective wiring lines have the state reflecting the shape of the semiconductor elements and the intersections. Such a difference in level also causes the foregoing problems.

Particularly, in a projection type display used for a projector or the like, since an extremely minute small display of about 1 to 2 inches in size is enlarged and projected, the foregoing problems become tangible.

In regard to the above described problems, a black mask (or a black matrix) has been conventionally used to shade the region where a picture image is disturbed, so that the ratio of contrast is increased. In recent years, since miniaturization of a device has been progressed and the controllability of a shading region for the purpose of a high aperture factor has been required, the structure in which the black mask is provided at a TFT side substrate has become the main stream.

However, in the case where the black mask is provided at the TFT side substrate, there arises various problems such as increase of patterning steps, increase of parasitic capacitance, and lowering of an aperture factor. Because of such circumstances, it is desired to achieve a technique by which the ratio of contrast can be assured without causing the above described problems.

SUMMARY OF THE INVENTION

An object of the present invention is therefore to solve the above-mentioned problems and to provide means for forming an extremely fine active matrix type display device by a simple process.

In order to achieve the above object, according to one aspect of the present invention, a method of manufacturing a semiconductor device comprises the steps of: flattening an insulating film formed on a substrate having an insulating surface; forming a plurality of electrodes on the insulating film; forming an insulating layer covering the plurality of electrodes; and flattening the surfaces of the plurality of electrodes and the surface of the insulating layer so that both the surfaces form the same plane, and boundary portions of the plurality of electrodes are filled with the insulating layer, wherein the flattening step is carried out with a precision of not larger than 20% of a thickness of the electrodes.

According to another aspect of the present invention, a method of manufacturing a semiconductor device including at least a first substrate, a transparent second substrate, and a liquid crystal layer held between the first substrate and the second substrate, the method comprising the steps of: flattening an insulating film formed on the first substrate; forming stripe-shaped electrodes on the insulating film; forming an insulating layer covering the stripe-shaped electrodes; and flattening the surfaces of the stripe-shaped electrodes and the surface of the insulating layer so that both the surfaces form the same plane, and boundary portions of the stripe-shape electrodes are filled with the insulating layer, wherein the flattening step is carried out with a precision of not larger than 20% of a thickness of the electrodes.

According to still another aspect of the present invention, a method of manufacturing a semiconductor device comprises the steps of: forming a plurality of semiconductor elements on a substrate having an insulating surface; forming an interlayer insulating film; flattening the interlayer insulating film; forming pixel electrodes electrically connected to the semiconductor elements on the interlayer insulating film; forming an insulating layer covering the pixel electrodes; and flattening the surfaces of the pixel electrodes and the surface of the insulating layer so that both the surfaces form the same plane, and boundary portions of the pixel electrodes are filled with the insulating layer, wherein the flattening step is carried out with a precision of not larger than 20% of a thickness of the electrodes.

According to still another aspect of the present invention, a method of manufacturing a semiconductor device including at least a substrate having a plurality of semiconductor elements formed in matrix and a plurality of pixel electrodes respectively connected to the semiconductor elements, and a liquid crystal layer held on the substrate, the method comprising the steps of: forming an interlayer insulating film; flattening the interlayer insulating film; forming pixel electrodes electrically connected to the semiconductor elements on the interlayer insulating film; forming an insulating layer covering the pixel electrodes; and flattening the surfaces of the pixel electrodes and the surface of the insulating layer so that both the surfaces form the same plane, and boundary portions of the pixel electrodes are filled with the insulating layer, wherein the flattening step is carried out with a precision of not larger than 20% of a thickness of the electrodes.

In the above-mentioned structure, a typical example in which a liquid crystal layer is held, is such a structure that a liquid crystal layer is held between a substrate (first substrate) including a plurality of pixel electrodes and an opposite substrate (second substrate) facing the first substrate. There can be a case where the second substrate is not required since, when a PDLC (Polymer Diffusion Liquid Crystal) is used for a liquid crystal layer, the liquid crystal layer itself is solidified.

Although a thin film transistor (TFT) is typical for a semiconductor element, other semiconductor elements such as an insulated gate field effect transistor (IGFET), a thin film diode, a MIM (Metal-Insulator-Metal) element, and a varistor element may be used.

If the flattening is made within 20% of the thickness of the electrode, it is possible to suppress the influence of unevenness to the thickness of the liquid crystal layer. Especially, in the case of a reflection type liquid crystal panel, since poor display due to the unevenness of the thickness of the liquid crystal layer becomes tangible, it is effective to use the present invention disclosed in the present specification.

In general, the film thickness of a pixel electrode is about 100 to 300 nm. Thus, it is appropriate that the flatness of the insulating film or the oriented film is restricted to not larger than about 20 to 60 nm. For example, in the structure as shown in FIG. 12, it is appropriate that the value indicated by "a" or "b" is made 20 to 60 nm.

Although it is preferable that the flattening is restricted within 20% of the thickness of the pixel electrode, in practical viewpoint, it is effective even if the flattening is restricted within 50% of the pixel electrode.

As to the degree of flatness, assuming that the surface state as shown in FIG. 13 is obtained, it is appropriate to realize such flatness that the value of $\theta 0$ is not larger than 15°. By doing so, it is possible to effectively use the light reflected by a reflecting pixel electrode formed thereon in optical modulation. Of course, in the state shown in FIG. 13, it is important to make the value of "c" not larger than 20 to 60 nm.

As a desirable limiting condition of parameters indicating the degree of flatness, as shown in FIG. 14, it is effective to make the condition that the amount of light reflected by the reflecting surface of a reflecting electrode is not smaller than 70% (with respect to the amount of incident light) in the cone with an inclination angle of 15° with respect to the direction of an optical axis.

If these limiting conditions are combined with other parameters, they become more effective. That is, if the flatness is secured so as to satisfy the limiting conditions of these parameters or conditions regulated by the combination of limiting conditions of the respective parameters, more excellent effects of the present invention can be obtained.

BRIEF DESCRIPTION OF THE DRAWINGS

In the accompanying drawings:

FIGS. 11A to 11F are views for explaining examples of applied products of the present invention;

DETAILED DESCRIPTION OF THE PREFERRED EMBODIMENTS

Figure 1A:
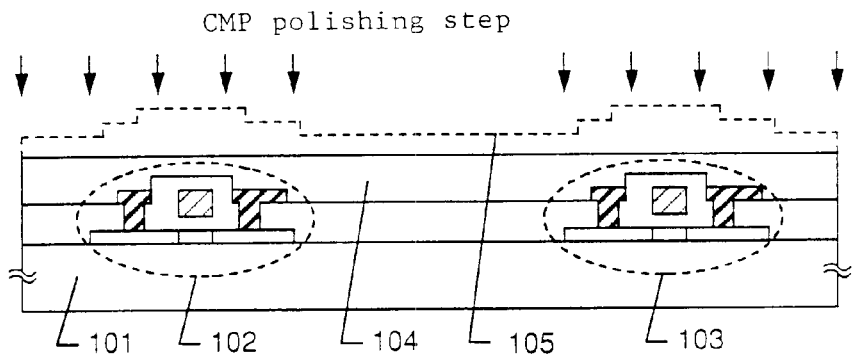
FIGS. 1A to 1C are views for explaining the outline of the present invention.
Figure 1B:
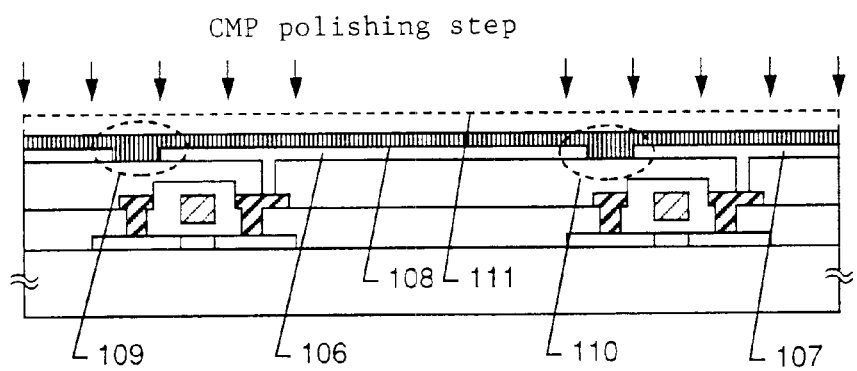

First, the outline of the present invention will be described with reference to FIGS. 1A to 1C. In FIG. 1A, reference numeral 101 denotes a substrate having an insulating surface, 102 denotes a first pixel TFT formed on the substrate 101, and 103 denotes a second pixel TFT. The first and second TFTs 102 and 103 are covered with an interlayer insulating film 104. The interlayer insulating film 104 is an insulating film for electrically insulating pixel electrodes formed later from the TFTs.

The first feature of the present invention is that the interlayer insulating film 104 having a sufficient thickness is deposited in advance, and a flattening step (especially flattening by mechanical polishing) is carried out. As described later, the polishing step of the interlayer insulating film 104 plays an important role when a pixel electrode is subsequently formed. In FIG. 1A, a dotted line denoted by 105 indicates the shape of the interlayer insulating film 104 prior to the polishing step, and this indicates that the unevenness of the interlayer insulating film 104 is flattened by the mechanical polishing step.

It is important to carry out this flattening so that the remaining unevenness becomes not larger than 10% of the thickness of the pixel electrode.

As the mechanical polishing, a CMP (Chemical Mechanical Polishing) technique can be typically cited. The CMP technique is such a technique that the surface of a thin film is flattened by chemical etching using an etchant and by mechanical etching using a polishing agent (abrasive).

Other than the mechanical polishing, an etch back technique using a dry etching method may be used. Although the etch back technique is inferior to the CMP technique in flatness, it has advantages that addition of an apparatus is not particularly required, and particles (scrapings) are not produced during the treatment.

Next, a metal thin film (not shown) is formed on the flattened interlayer insulating film 104, and is patterned to form pixel electrodes 106 and 107. In the present invention, since the interlayer insulating film is flattened, the formed pixel electrodes 106 and 107 have extremely flat surfaces (FIG. 1B).

The pixel electrodes 106 and 107 are respectively connected to the pixel TFTs 102 and 103 through contact holes. The pixel electrodes 106 and 107 are covered with an insulating layer 108. At this time, the insulating layer 108 having a sufficient thickness is deposited so that completely embedded states are obtained for boundary portions 109 and 110.

The second feature of the present invention is to leave the insulating layer 108 in only the boundary portions 109 and 110 by mechanically polishing the insulating layer 108. By this step, embedded insulating layers 112 and 113 in the state shown in FIG. 1C are formed. In FIG. 1B, a dotted line denoted by 111 indicates the shape of the insulating layer 108 before the polishing step, and this indicates the state that the insulating layer 108 is shaved by the mechanical polishing step.

In this way, when the insulating layer is polished, at last, the surfaces of the pixel electrodes 106 and 107 appear. Even if the polishing is stopped at this state, the state shown in FIG. 1C can be obtained. However, it is effective to progress the polishing to flatten the surfaces of the pixel electrodes at the same time. In this case, it is appropriate to suitably change the condition of the polishing treatment for example, the abrasive is made fine) so that the surface of the pixel electrode becomes the most preferable state.

Figure 1C:
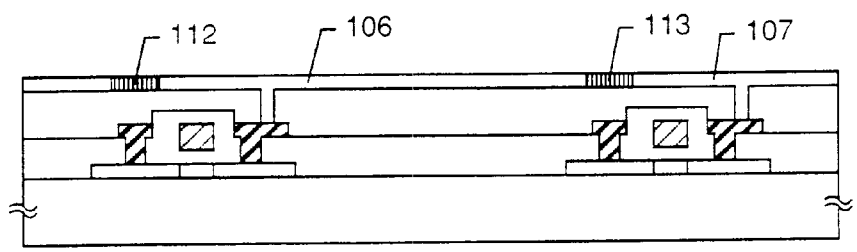
Figure 2A:
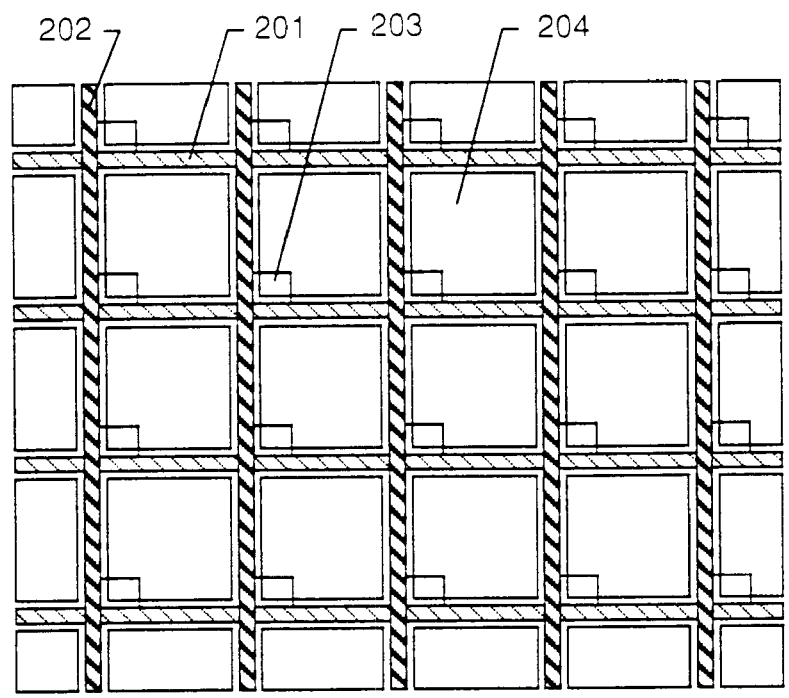
FIGS. 2A and 2B are views showing the structure of a conventional pixel matrix circuit.
Figure 2B:
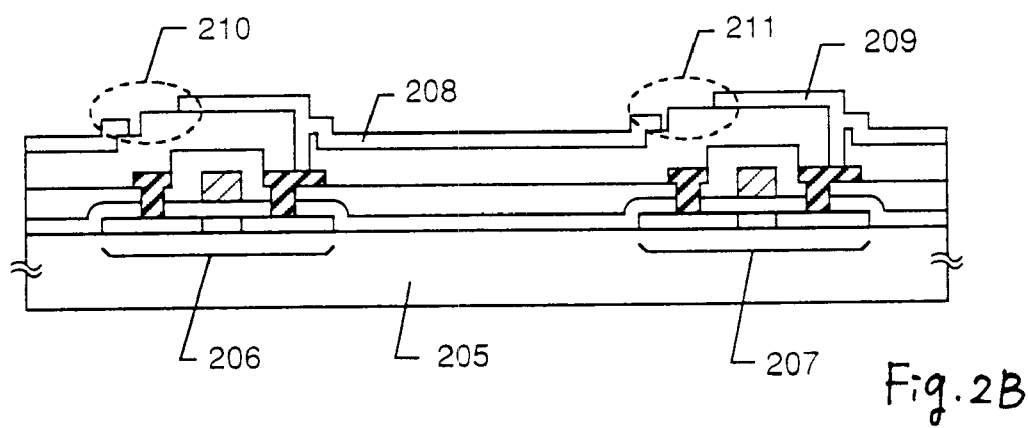

In the final state as shown in FIG. 1C, such a state is obtained that the boundary portions 109 and 110 formed between the pixel electrodes are completely filled with the embedded insulating layers 112 and 113. At this time, the surfaces of the pixel electrodes 106 and 107 and the surfaces of the embedded insulating layers 112 and 113 form the same plane.

At this time, as described before, the polishing step of the interlayer insulating film 104 as the first feature of the present invention plays an important role. This will be described below.

For example, in the case where the polishing step of the interlayer insulating film 104 is not carried out, the shape denoted by 105 is directly reflected to the shape of the pixel electrodes 106 and 107 and the insulating layer 108. In general, the boundary portions 109 and 110 are inevitably formed over the TFT (source wiring line) so as to improve an aperture factor. Thus, the boundary portions 109 and 110 are formed at a higher position than an effective pixel electrode surface (the flattest surface which does not overlap with the TFT or wiring line).

Thus, if the insulating layer 108 is mechanically polished in this state, the pixel electrode surface positioned over the TFT is first exposed. Thus, when the above-mentioned effective pixel electrode surface is polished, the polishing of the pixel electrode over the TFT and the embedded insulating layer is considerably progressed, so that a uniform polishing treatment becomes difficult.

Although it is conceivable that a thick interlayer insulating film 104 is deposited to flatten the unevenness due to a TFT and the like, when the interlayer insulating film 104 is merely deposited, the considerable unevenness such as undulation always exists on the surface. In that case, in order to flatten the undulation, the insulating layer 108 formed later must be made thick and the mechanical polishing step must be carried out for a long time, which causes problems such as lowering of a throughput and increase of particles produced.

As described above, it is an extremely effective means to flatten the interlayer insulating film by the mechanical polishing step prior to the formation of the pixel electrodes. That is, although the major object of the present invention is to obtain the state shown in FIG. 1C by the polishing step shown in FIG. 1B, the invention has the feature that in order to effectively carry out the polishing step shown in FIG. 1B, the polishing step shown in FIG. 1A is carried out.

As shown in FIG. 1C, the gaps (boundary portions) between the pixel electrodes are filled with the embedded insulating layers to remove unnecessary differences in level. By doing so, it is possible to obtain an extremely fine active matrix type display device which does not have problems such as poor orientation of a liquid crystal material or diffused reflection of light at the portion of a difference in level.

[Embodiment 1]

In this embodiment, an example of steps of manufacturing a pixel matrix circuit of a reflection type LCD using the present invention will be described with reference to FIGS. 3 and 4. Since the present invention relates to a technique for flattening a pixel, a TFT structure itself is not limited to this embodiment.

First, a substrate 301 having an insulating surface is prepared. In this embodiment, a silicon oxide film as an under layer is formed on the glass substrate. Active layers 302 to 304 made of crystalline silicon films are formed on the substrate 301. In this embodiment, although only three TFTs are shown, actually a million TFTs or more are formed in a pixel matrix circuit.

In this embodiment, an amorphous silicon film is thermally crystallized to obtain a crystalline silicon film. The crystalline silicon film is patterned by a normal photolithography step to obtain the active layers 302 to 304. In this embodiment, a catalytic element (nickel) for promoting crystallization is added in the crystallization. This technique is disclosed in detail in Japanese Patent Unexamined Publication No. Hei. 7-130652.

Next, a silicon oxide film with a thickness of 150 nm is formed as a gate insulating film. An aluminum film (not shown) including scandium of 0.2 wt % is formed thereon, and is patterned to form an island-shaped pattern as an origin of a gate electrode.

In this embodiment, a technique disclosed in Japanese Patent Unexamined Publication No. Hei. 7-135318 is used. The details of the technique may be seen in the publication.

First, anodic oxidation is carried out in a solution of oxalic acid of 3% while a resist mask used for patterning remains. At this time, a platinum electrode is used as a cathode, a transforming current of 2 to 3 mV is made to flow, and a reached voltage is made 8 V. In this way, porous anodic oxidation films 306 to 308 are formed.

Thereafter, after the resist mask is removed, anodic oxidation is carried out in a solution obtained by neutralizing an ethylene glycol solution of tartaric acid of 3% with aqueous ammonia. At this time, it is appropriate that the transforming current is made 5 to 6 mV, and the reached voltage is made 100 V. In this way, dense anodic oxidation films 309 to 311 are formed.

Figure 3A:
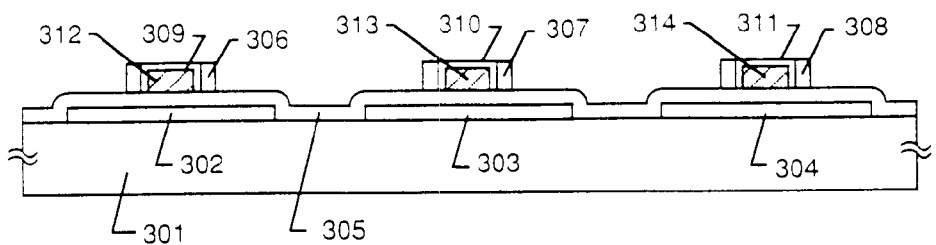
FIGS. 3A to 3D are views showing manufacturing steps of a reflection type LCD.

Gate electrodes 312 to 314 are defined by the above step. In the pixel matrix circuit, at the same time as the formation of the gate electrodes, a gate line for connecting the respective gate electrodes is also formed for every one line (FIG. 3A).

Next, the gate insulating film 305 is etched by using the gate electrodes 312 to 314 as masks. The etching is carried out by a dry etching method using a $CF_4$ gas. By this, gate insulating films having the shape indicated by 315 to 317 are formed.

In this state, an impurity ion to impart one conductivity is added by an ion implantation method or a plasma doping method. In this case, when the pixel matrix circuit is constituted by N-type TFTs, it is appropriate that P (phosphorus) ions are added, and when the pixel matrix circuit is constituted by P-type TFTs, it is appropriate that B (boron) ions are added.

The above addition step of impurity ions is divided into two steps. The first step is carried out by a high acceleration voltage of about 80 KeV and is adjusted so that the peak of an impurity ion distribution is positioned under the ends (protrusions) of the gate insulating films 315 to 317. The second step is carried out by a low acceleration voltage of about 5 KeV and is adjusted so that the impurity ion is not added to the portions under the ends (protrusions) of the gate insulating films 315 to 317.

Figure 3B:
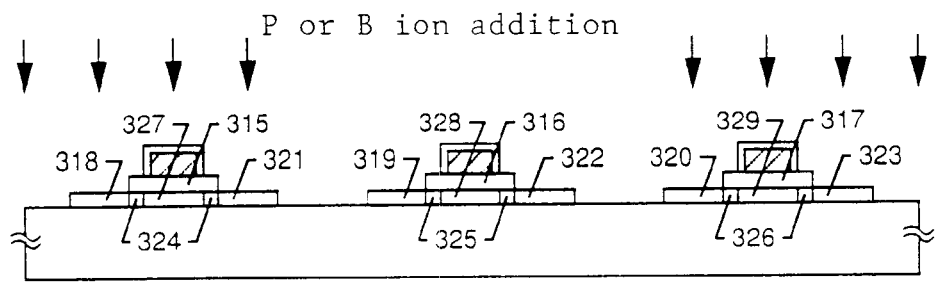

In this way, there are formed source regions 318 to 320, drain regions 321 to 323, low concentration impurity regions (also referred to as LDD regions) 324 to 326, and channel formation regions 327 to 329 of the TFTs (FIG. 3B).

At this time, it is preferable to add impurity ions so that the source drain regions have a sheet resistance of 300 to 500 $\Omega/\neg$. It is necessary to optimize the low concentration impurity regions in accordance with the performance of the TFT. After the addition step of impurity ions is ended, a heat treatment is carried out to activate the impurity ions.

Figure 3C:
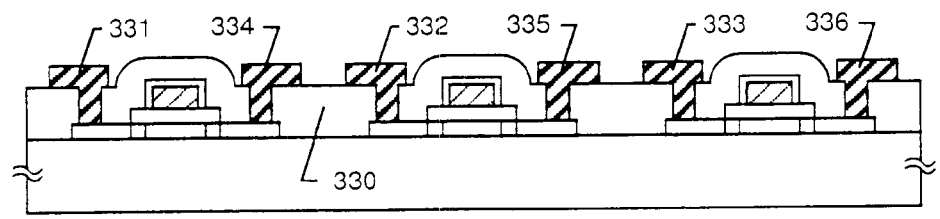

Next, a silicon oxide film with a thickness of 400 nm is formed as a first interlayer insulating film 330, and source electrodes 331 to 333 and drain electrodes 334 to 336 are formed thereon (FIG. 3C).

Next, a silicon oxide film with a thickness of 0.5 to 1 $\mu$m is formed as a second interlayer insulating film 337. It is preferable to form a dense silicon oxide film by using a high density plasma source and the like since the degree of flatness at subsequent CMP polishing is improved. If only the condition of the CMP polishing is optimized, an organic resin film may also be used as the second interlayer insulating film 337. Polyimide, polyamide, polyimide amide, acryl, and the like may be used for the organic resin film.

Figure 3D:
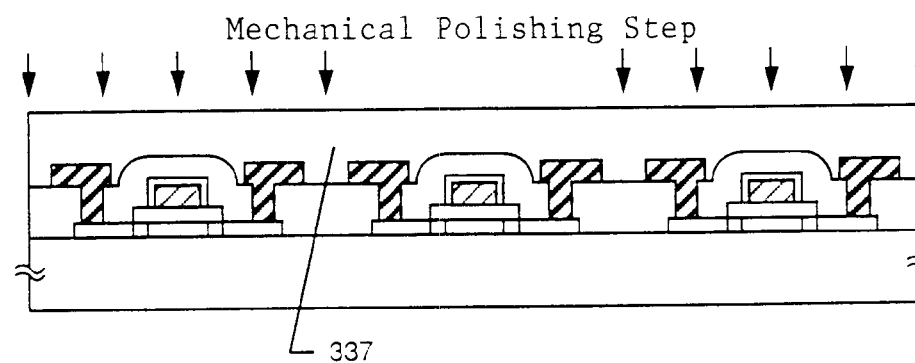

After the second interlayer insulating film 337 is formed, a first CMP polishing step is carried out. In this step, the second interlayer insulating film 337 is flattened so that a flat surface having no unevenness can be obtained. This flattening is carried out under the condition that the height of the remaining unevenness (a distance in the vertical direction between the top of a mountain and the bottom of a valley) becomes not larger than 10% of the thickness of a pixel electrode formed later (FIG. 3D).

Next, an aluminum film added with titanium of 1 wt % and having a thickness of 100 nm is formed and is patterned so that pixel electrodes 338 to 340 are formed. Of course, other metal material may be used.

Next, an insulating film 341 covering the pixel electrodes 338 to 340 is formed. As in this embodiment, when the pixel electrodes are formed so that the boundary portions are formed over the source wiring lines 331 to 333, the source wiring lines 331 to 333 function as black masks, so that it does not matter if the insulating film 341 is transparent.

However, in order to secure a more definite light shading function, it is preferable to use an insulating film having light shading properties such as an organic resin film with dispersed black pigment or carbon (a silicon oxide film coated with a solution such as PSG may be used). By doing so, the definite shading function can be secured even in the case where the source wiring line becomes thin or light from an oblique direction is incident.

Moreover, if a material of the lowest possible relative dielectric constant as compared with a used liquid crystal material is employed, it is also possible to suppress the formation of a lateral direction electric field between the pixel electrodes.

Figure 4A:
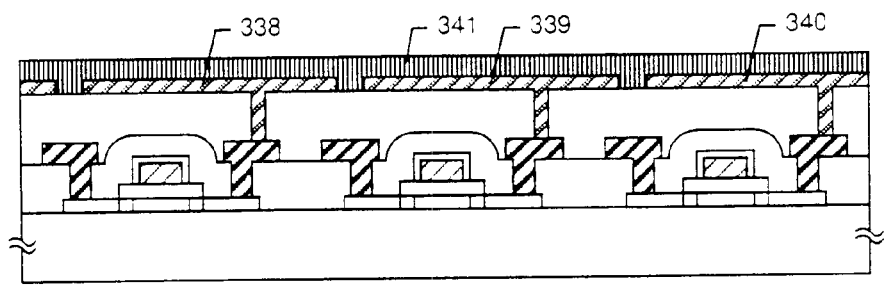
FIGS. 4A to 4C are views showing manufacturing steps of the reflection type LCD.
Figure 4B:
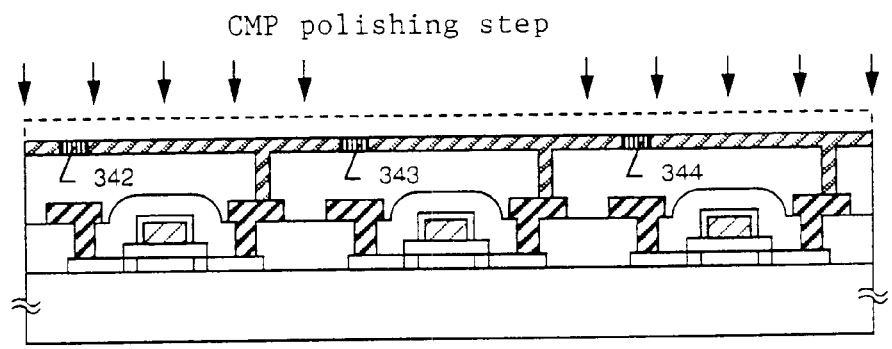

In this way, the state shown in FIG. 4A is obtained. After the state shown in FIG. 4A is obtained, a second CMP polishing step is carried out to form embedded insulating layers 342 to 344 filling in the gaps between the pixel electrodes 338 to 340. At this time, since the surfaces of the pixel electrodes 338 to 340 are almost coincident with the surfaces of the embedded insulating layers 342 to 344 in level, the superior flat surfaces can be obtained (FIG. 4B).

Figure 6:
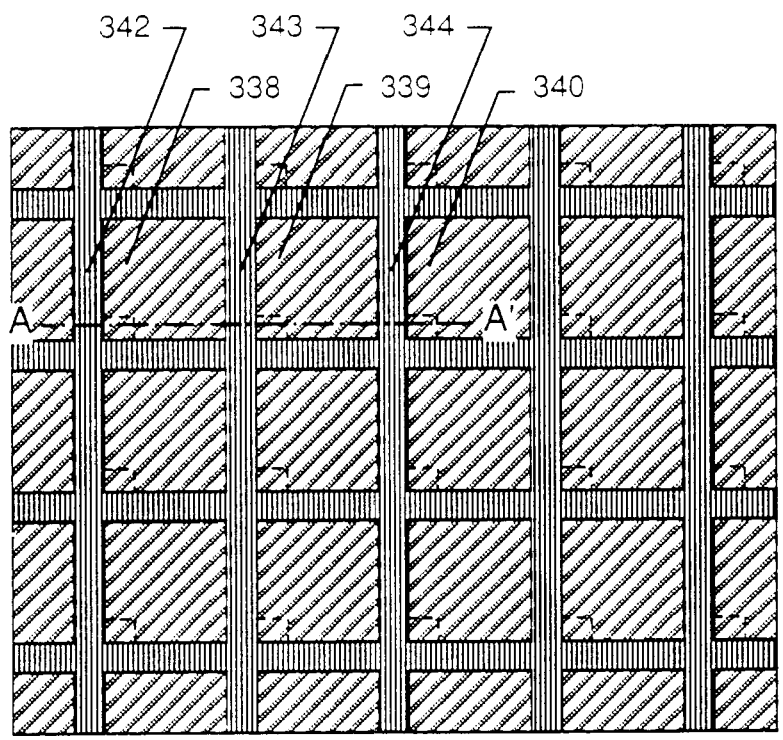
FIG. 6 is a view showing a pixel matrix circuit seen from the above.

FIG. 6 is a top view showing this state seen from the above. FIG. 6 is a schematic view in which attention is paid to a pixel matrix circuit, and the structure of FIG. 4B corresponds to a section taken along line A–A' in FIG. 6. Reference numerals in FIG. 6 correspond to those used in FIGS. 4A and 4B.

As shown in FIG. 6, the pixel electrodes are arranged in matrix, and the gaps (boundary portions) therebetween are filled with the embedded insulating layers 342 to 344. Thus, although the embedded insulating layers 342 to 344 are respectively given reference numerals, the layers are actually formed of one body in matrix.

In the manner described above, the pixel matrix circuit is completed. Actually, driving circuits and the like for driving the pixel TFTs are formed on the same substrate at the same time. Such a substrate is normally referred to as a TFT side substrate or an active matrix substrate. In the present specification, the active matrix substrate will be referred to as a first substrate.

Figure 4C:
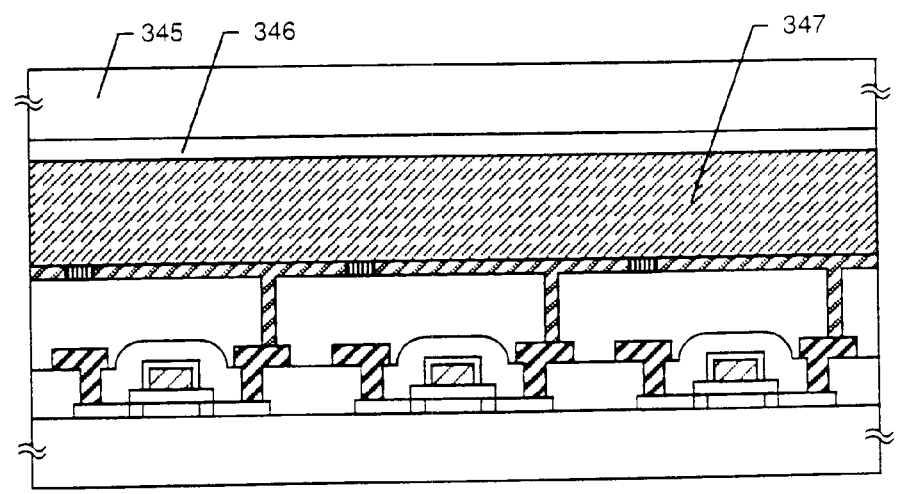

After the first substrate is completed, an opposite substrate including a transparent substrate 345 and an opposite electrode 346 formed thereon (in the present specification, this substrate will be referred to as a second substrate) is bonded to the first substrate, and a liquid crystal layer 347 is held therebetween. In this way, the reflection type LCD as shown in FIG. 4C is completed.

The cell assembling step may be carried out according to a well known method. It is also possible to disperse a two-color pigment into the liquid crystal layer or to provide a color filter on the opposite substrate. Since the kind of such a liquid crystal layer, the existence of the color filter, and the like are changed according to the mode where the liquid crystal is driven, an operator may suitably determine.

Although not shown in this embodiment, such a structure may be adopted that a color filter is arranged on the upper surface of the pixel electrode.

In the liquid crystal panel obtained through the manufacturing steps as shown in this embodiment, since the flatness of the reflecting pixel electrode is superior, the structure in which the color filter is arranged on the pixel electrode becomes effective. In addition, it is also possible to adopt such a structure that a dielectric film is disposed into a single layer or multilayer to reflect light in a specified wavelength band region or a specified polarized state. This structure is based on the same principle as a dichroic mirror or a polarization beam splitter.

In general, when there is a problem in the flatness of the surface of a reflecting electrode, it is not preferable to arrange a color filter on the surface of the reflecting electrode since it causes color shading or blurred display.

[Embodiment 2]

In this embodiment, an example of steps of manufacturing a pixel matrix circuit of a transmission type LCD by using the present invention will be described with reference to FIGS. 5A to 5C. Since the steps are the same as those of the reflection type LCD shown in the Embodiment 1 partway, only different points will be described here.

Figure 5A:
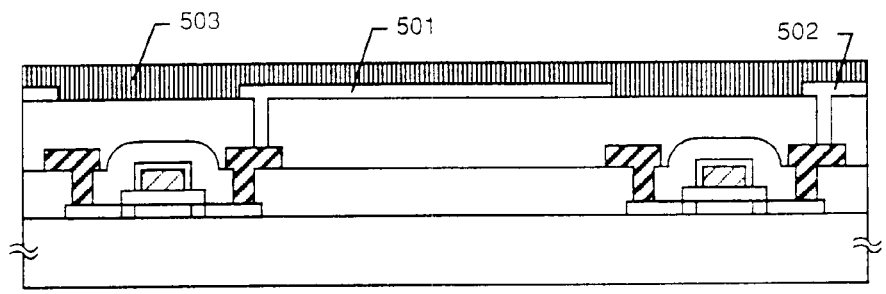
FIGS. 5A to 5C are views showing manufacturing steps of a transmission type LCD.
Figure 5B:
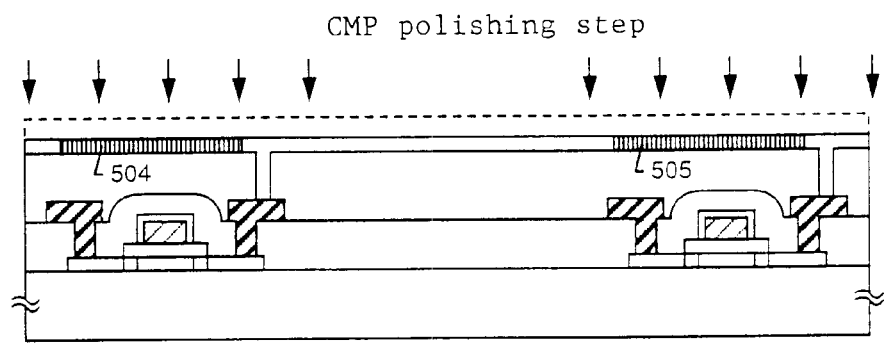
Figure 5C:
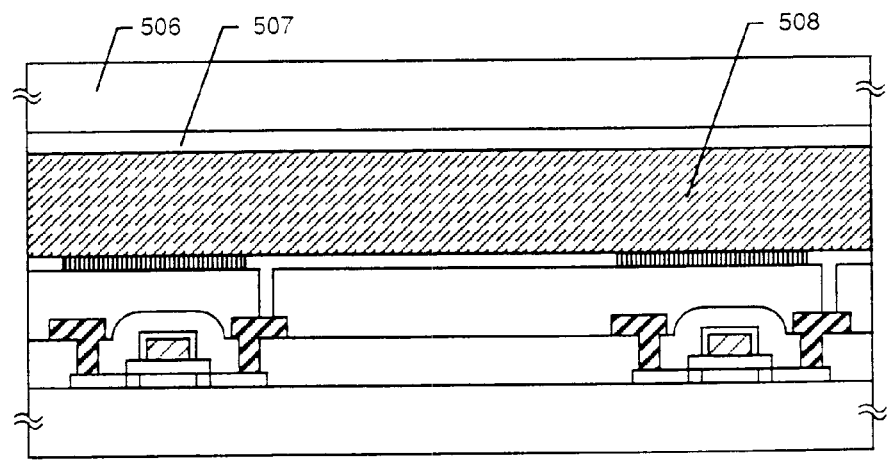

After the first CMP polishing step as shown in FIG. 3D is ended, pixel electrodes 501 and 502 shown in FIG. 5A are formed. In this embodiment, as the material for the pixel electrodes 501 and 502, transparent conductive films (ITO, $SnO_2$, etc.) are used. At this time, the pixel electrodes 501 and 502 are formed so that they do not overlap with the TFTs.

Next, an insulating layer 503 covering the pixel electrodes 501 and 502 is formed. In this embodiment, for the insulating layer 503, polyimide with a dispersed black pigment or the like is used. In the case of the transmission type, since the active layer of the TFT is also required to be shaded, it is preferable to use an insulating layer having light shading properties (FIG. 5A).

Next, the second CMP polishing step is carried out to form embedded insulating layers 504 and 505 which form the same plane as the pixel electrodes 501 and 502.

Figure 7:
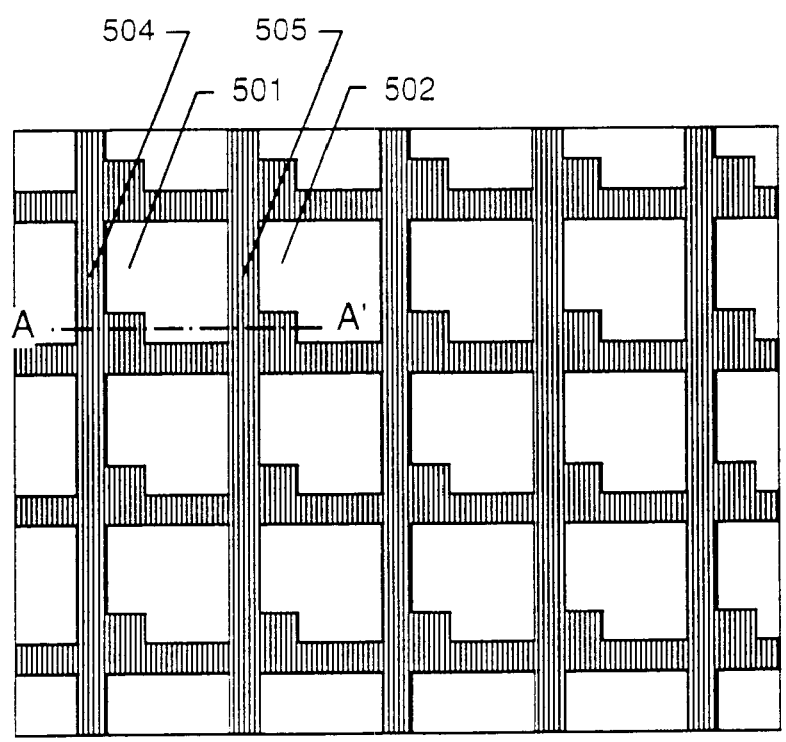
FIG. 7 is a view showing a pixel matrix circuit seen from the above.

FIG. 7 is a top view showing this state seen from the above. FIG. 7 is a schematic view in which attention is paid to the pixel matrix circuit, and the structure of FIG. 5B corresponds to a section taken along line A–A' in FIG. 7. Reference numerals in FIG. 7 correspond to those used in FIGS. 5A and 5B.

As shown in FIG. 7, a plurality of pixel electrodes are arranged in matrix, and the boundary portions therebetween are filled with integrated embedded insulating layers. In this embodiment, since the embedded insulating layers are formed over the TFTs, there is also obtained an effect to suppress the change of resistance due to light impinging on the active layer.

In the manner described above, a TFT side substrate of the transmission type LCD is completed. After the TFT side substrate is completed, by a normal cell assembling step, a liquid crystal layer 508 is held between an opposite substrate, which is constituted by a transparent substrate 506 and an opposite electrode 507, and the TFT side substrate. In this way, the transmission type LCD as shown in FIG. 5C is completed.

In this embodiment, it is also effective to mechanically polish the pixel electrodes 501 to 502 (338 to 340) themselves to flatten the surfaces. At this time, it is preferable to cause the surface state to have minute unevenness if a direct viewing display is formed, and to cause the surface state to have a mirror surface if a projection type display is formed.

[Embodiment 3]

In the manufacturing steps of the embodiment 1, only the second interlayer insulating film 337 and the embedded insulating layer 341 are flattened. However, in the present invention, it is also possible to make a flattening step to the first interlayer insulating layer 330.

In the case where an interlayer insulating film is formed of a lamination structure, it is also possible to make a flattening step for every formation of the respective layers.

In the present invention, before pixel electrodes are formed, sufficient flatness is secured, and further, the gaps between the pixel electrodes are filled with the embedded insulating layers to improve the flatness of the surfaces of the pixel electrodes. Thus, there is no problem even if the number of flattening steps is large, rather it is preferable.

[Embodiment 4]

In this embodiment, an example in which a TFT having a structure different from the TFT shown in the embodiment 1 is used as a semiconductor element for performing active matrix driving, will be described. The TFT having the structure described in this embodiment can be easily applied to the embodiment 2.

Figure 8:
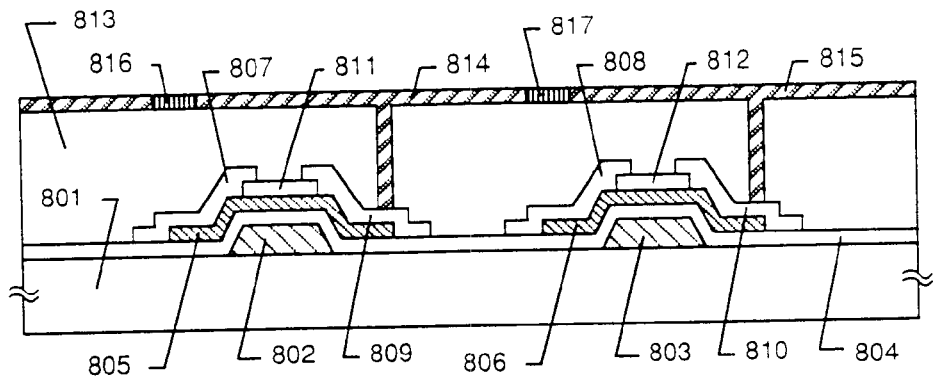
FIG. 8 is a view showing the structure of an active matrix substrate.

In the embodiment 1, although a coplanar type TFT as a typical top-gate type TFT is disclosed as an example, a bottom-gate type TFT may be used. FIG. 8 shows an example in which a reverse-stagger type TFT as a typical example of the bottom-gate type TFT is used.

In FIG. 8, 801 denotes a glass substrate, 802 and 803 denote gate electrodes, 804 denotes a gate insulating layer, and 805 and 806 denote active layers. The active layers 805 and 806 are formed of silicon films in which impurities are not intentionally added.

Reference numerals 807 and 808 denote source electrodes, 809 and 810 denote drain electrodes, and 811 and 812 denote silicon nitride films which become channel stoppers (or etching stoppers). That is, in the active layers 805 and 806, the regions under the channel stoppers 811 and 812 substantially function as channel formation regions.

The above is a basic structure of the reverse-stagger type TFT. In this embodiment, such a reverse-stagger type is covered with an interlayer insulating film 813 made of an organic resin film to make flattening, and pixel electrodes 814 and 815 are formed thereon. Of course, the gaps between the pixel electrodes are filled with imbedded insulating layers 816 and 817 by using the present invention.

Next, an example in which an insulated gate field effect transistor (IGFET) is formed as a semiconductor element of the present invention, will be described. The IGFET is also referred to as a MOSFET, and indicates a transistor formed on a silicon wafer.

Figure 9:
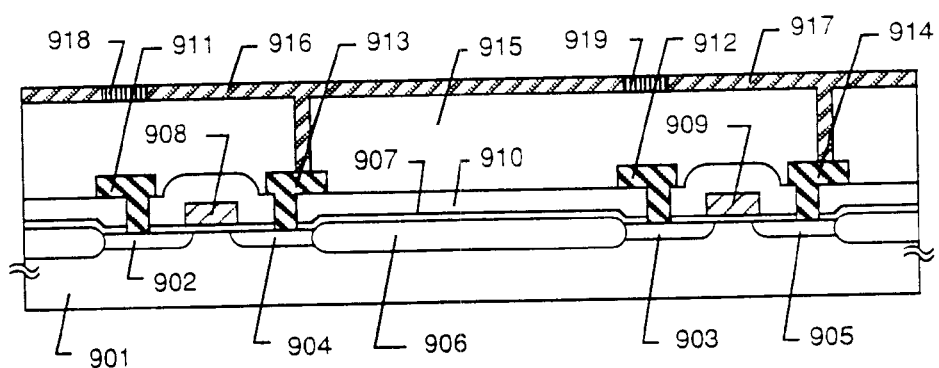
FIG. 9 is a view showing the structure of an active matrix substrate.

In FIG. 9, 901 denotes a silicon wafer, 902 and 903 denote source regions, and 904 and 905 denote drain regions. Source/drain regions can be formed by adding impurities through ion implantation and by thermally diffusing the impurities. Reference numeral 906 denotes an oxide for separating semiconductor elements and is formed by a normal LOCOS technique.

Next, reference numeral 907 denotes a gate insulating layer, 908 and 909 denote gate electrodes, 910 denotes a first interlayer insulating film, 911 and 912 denote source electrodes, and 913 and 914 denote drain electrodes. A second interlayer insulating film 915 is provided thereon to make flattening, and pixel electrodes 916 and 917 are formed on the flat surface. The gaps between the pixel electrodes are filled with embedded insulating layers 918 and 919 by using the present invention.

Other than the IGFET and the top-gate type or bottom-gate type TFT shown in this embodiment, the present invention can also be applied to an active matrix display using a thin film diode, a MIM element, a varistor element, or the like.

As described in the embodiment, the present invention can be applied to the reflection type LCD or the transmission type LCD using semiconductor elements of any structure.

Especially, the reflection type liquid crystal LCD has an advantage that a pixel area can be used to the full by flattening a portion over a semiconductor element and forming a pixel electrode thereon. The present invention is an effective technique in using the advantage more effectively. Thus, in the reflection type LCD using the present invention, a high resolution and a high aperture factor can be realized.

[Embodiment 5]

The present invention can also be applied to a simple matrix type display device. In this case, stripe-shaped electrodes are formed on each of a pair of substrates, the substrates are bonded to each other so that the electrodes cross with each other at right angles, and a liquid crystal layer is held therebetween.

In this case, if one of the substrates is made a transparent substrate, the other may be transparent or opaque. However, the stripe-shaped electrodes formed on the side of the transparent substrate are required to be made of transparent conductive films.

In this embodiment, the stripe-shaped electrodes made of aluminum or a material mainly including aluminum are formed at the side of the substrate paired with the transparent substrate, and the gaps between the electrodes extending in stripe are filled with insulating layers.

In the case where the present invention is applied to the simple matrix type LCD, if a material (organic resin material or the like) having a relative dielectric constant lower than the liquid crystal is used for the insulating layer, the effect to decrease the cross talk can also be obtained.

[Embodiment 6]

In the reflection type LCD formed by applying the present invention, various display modes of liquid crystal can be used. For example, an ECB (Electric-field Control Birefringence) mode, a PCGH (Phase Change Guest Host) mode, an OCB mode, a HAN mode, and a PDLC guest host mode are enumerated.

The ECB mode is a display mode in which a voltage applied to a liquid crystal layer is varied to change the orientation of the liquid crystal, and the change of birefringence of the liquid crystal layer generated at that time is detected by a pair of polarizing plates to make color display. In this case, since a system in which a color filter is not used, can also be adopted, bright display can be made.

The PCGH mode is a display mode in which a two-color pigment is mixed with a guest molecule for a host liquid crystal, and the orientation state of liquid crystal molecules is changed by a voltage applied to the liquid crystal, so that a light absorptivity of the liquid crystal layer is changed. In this case, since a system in which a polarizing plate is not used, can be adopted, high contrast can be obtained.

The PDLC mode is a display mode in which a polymer dispersion type liquid crystal with a macromolecule dispersed in a liquid crystal (or the liquid crystal is dispersed in the macromolecule) is used. In this case, since the polarizing plate is not necessary, bright display can be made. If a solid polymer dispersion type liquid crystal is used, it is also possible to make a structure in which a glass substrate is not used for the opposite side.

In these various display modes, according to the features, the existence of a polarizing plate, and the existence of a color filter can be freely set. For example, in the case of the PCGH mode, since the polarizing plate is not required, bright display can be realized even in a single-plate system using a color filter.

[Embodiment 7]

In this embodiment, an example of an electrooptical device in which the present invention is used as a display, will be described. First, the case where the reflection type LCD shown in the embodiment 1 is applied to a three-plate projector, will be described with reference to FIG. 10A.

Figure 10A:
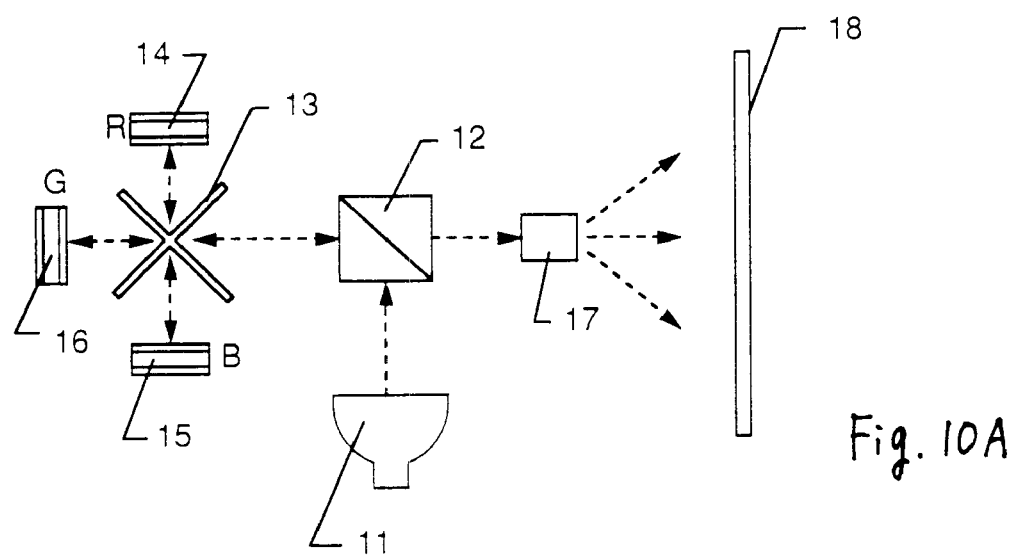
FIGS. 10A and 10B are views showing the structure of a projector.

In FIG. 10A, light including R (red), B (blue) and G (green) components emitted from a light source 11 such as a metal halide lamp and a halogen lamp is reflected by a polarization beam splitter 12 and travels to a cross dichroic mirror 13.

The polarization beam splitter is an optical filter having a function to reflect or transmit light according to the polarizing direction of the light. In this case, the light from the light source 11 is polarized so that the light is reflected by the polarization beam splitter.

At this time, at the cross dichroic mirror 13, R-component light is reflected in the direction of a liquid crystal panel 14 corresponding to R, and B-component light is reflected in the direction of a liquid crystal panel 15 corresponding to B. G-component light is transmitted through the cross dichroic mirror 13, and is incident on a liquid crystal panel 16 corresponding to G.

The respective liquid crystal panels 14 to 16 are constructed in the following manner. That is, liquid crystal molecules are oriented so that when the pixel is in an off state, the incident light is reflected while the polarizing direction of the incident light is not changed. On the other hand, when the pixel is in an on state, the orientation state of the liquid crystal layer is changed, and in accordance with the change, the polarizing direction of the incident light is also changed.

The rays of light reflected by these liquid crystal panels 14 to 16 are again reflected (only G-component light is transmitted) by the cross dichroic mirror 13 and are synthesized, and are again incident on the polarization beam splitter 12.

At this time, since the polarizing direction of the light reflected by the pixel region which is in an on state, is changed, the light is transmitted through the polarization beam splitter 12. On the other hand, since the polarizing direction of the light reflected by the pixel region which is in an off state, is not changed, the light is reflected by the polarization beam splitter 12.

In this way, when pixel regions arranged in matrix in the pixel matrix circuit are controlled on/off by a plurality of semiconductor elements, only light reflected by a specific pixel region can be transmitted through the polarization beam splitter 12. This operation is common to the respective liquid crystal panels 14 to 16.

The light including picture information and transmitted through the polarization beam splitter 12 in the manner described above, is enlarged by an optical system lens 17 constituted by a projection lens and the like, and is projected on a screen 18.

In the reflection type LCD using the present invention, a high resolution and a high aperture factor can be realized by filling the gaps between the pixel electrodes. In the case where the pixel electrodes are flattened, a high reflectivity can be realized. Thus, like the projection type projector of FIG. 10A, even in an electrooptical device which enlarges and projects a picture image, superior display performance can be realized.

Next, the case where the transmission type LCD shown in the embodiment 2 is applied to a three-plate projector, will be described with reference to FIG. 10B.

Figure 10B:
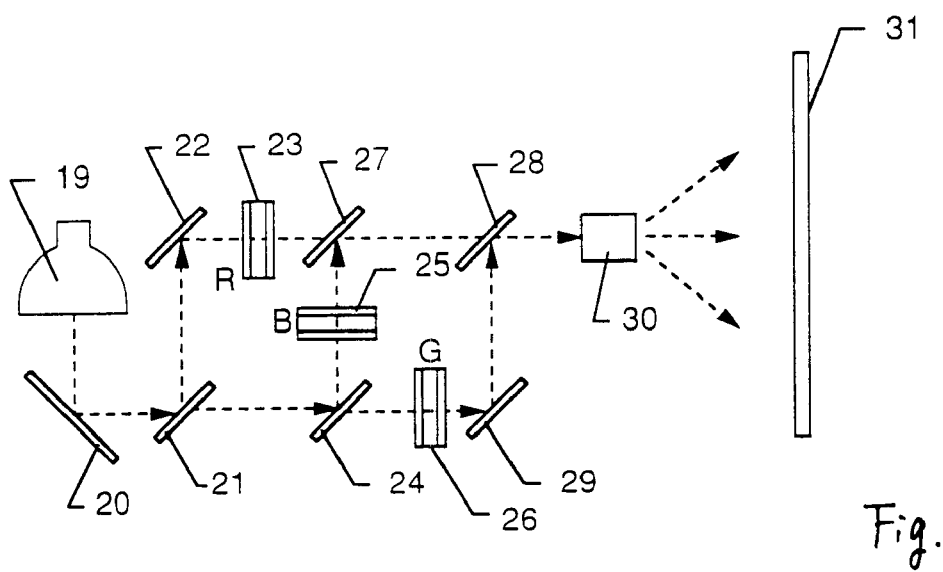
Figure 12:
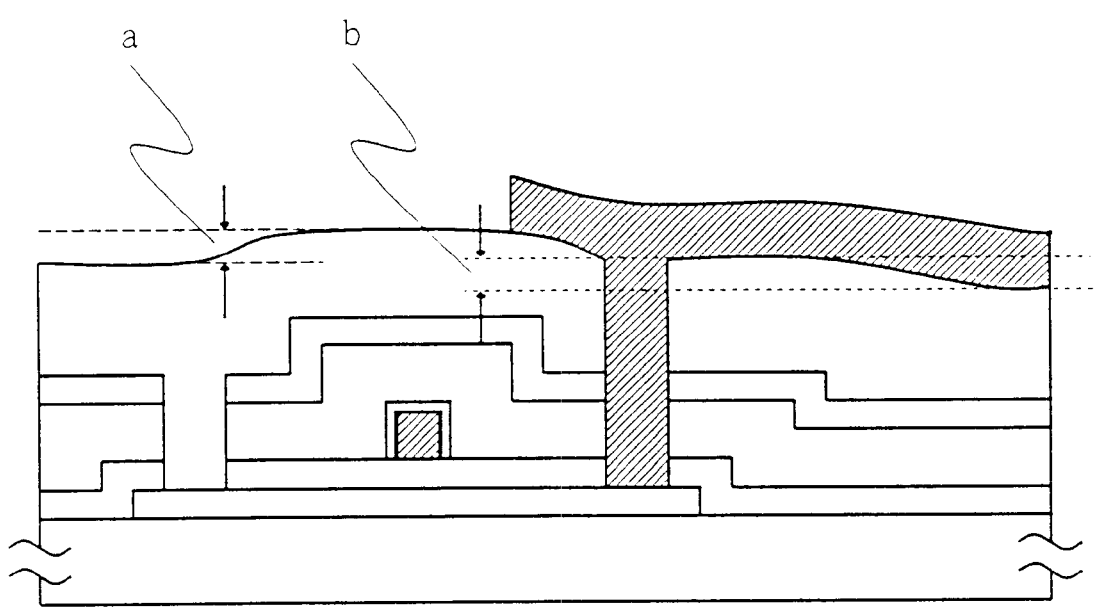
FIG. 12 is a view explaining the flatness.
Figure 13:
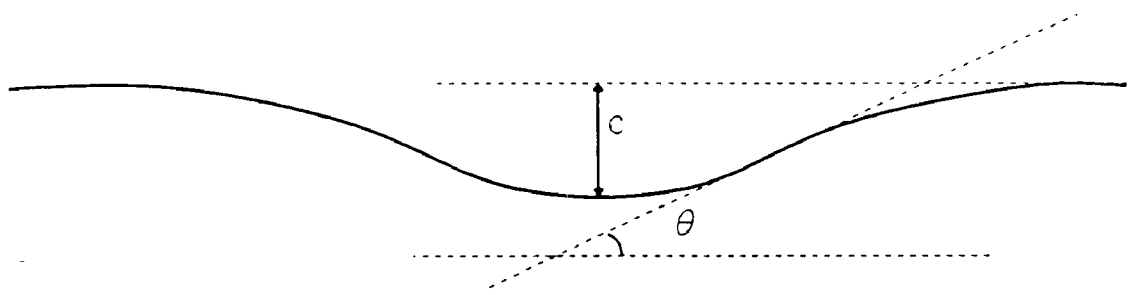
FIG. 13 is a view explaining the flatness.
Figure 14:
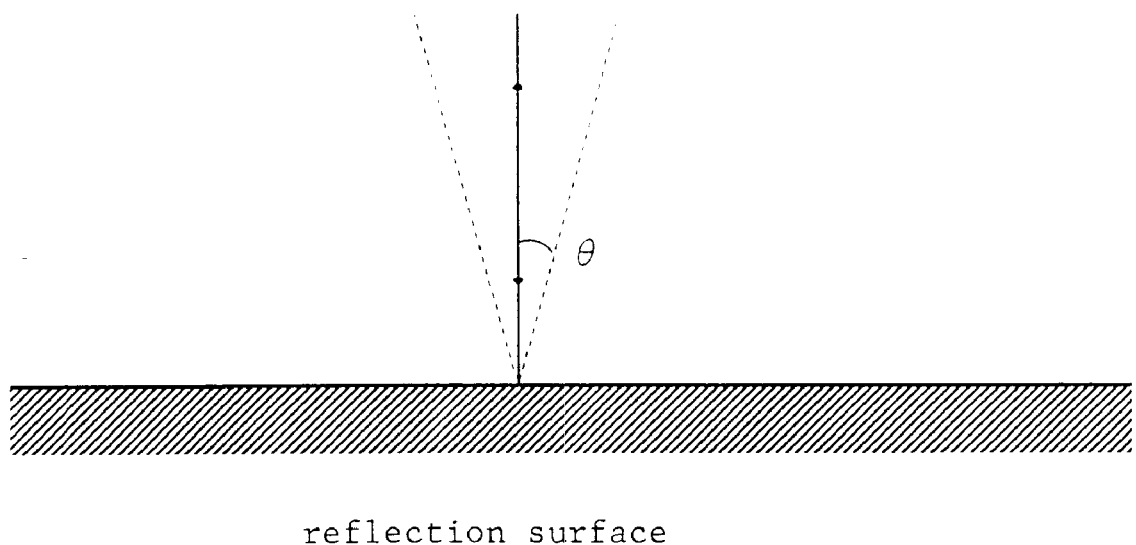
FIG. 14 is a view explaining the flatness.

In FIG. 10B, 19 denotes a light source such as a halogen lamp, and 20 denotes a reflector. The light including RGB components is incident on a dichroic mirror 21, and only R-component light is reflected by this mirror. Then R-component light is reflected by a reflector 22, and is incident on a liquid crystal panel 23 corresponding to R.

The light transmitted through the dichroic mirror 21 is incident on a dichroic mirror 24, and only B-component light is reflected here. The reflected B-component light is incident on a liquid crystal panel 25 corresponding to B. G-component light transmitted through the dichroic mirror 24 is incident on a liquid crystal panel 26 corresponding to G.

The R-component light is synthesized with the B-component light at a dichroic mirror 27, and is incident on a dichroic mirror 28. G-component light is reflected by a reflector 29, and is incident on the dichroic mirror 28. All rays of light of RGB components are synthesized here, are enlarged by a projection lens 30, and are projected on a screen 31.

Since the transmission type LCD using the present invention has also a high resolution and a high aperture factor, an electrooptical device having superior display performance can be constructed. Especially, that the aperture factor is high is the most remarkable advantage of the transmission type LCD of the present invention.

[Embodiment 8]

In this embodiment, applied products (electrooptical devices) to which the present invention can be applied, will be described with reference to FIGS. 11A to 11F. The electrooptical devices using the. present invention include a video camera, a still camera, a projector, a head mount display, a car navigation system, a personal computer, a portable information terminal (mobile computer, portable telephone, etc.), and the like.

FIG. 11A shows a mobile computer which is constituted by a main body 2001, a camera portion 2002, an image receiving portion 2003, an operation switch 2004, and a display device 2005. When the reflection type LCD of the present invention is applied to the display device 2005, further miniaturization and decrease of consumed power can be realized.

FIG. 11B shows a head mount display which is constituted by a main body 2101, a display device 2102, and a band portion 2103. When the reflection type LCD of the present invention is applied to the display device 2102, great miniaturization of the device can be realized.

FIG. 11C shows a front type projector which is constituted by a main body 2201, a light source 2202, a display device 2203, an optical system 2204, and a screen 2205. When the transmission type LCD of the present invention is applied to the display device 2203, fine picture images can be realized.

FIG. 11D shows a portable telephone which is constituted by a main body 2301, an audio output portion 2302, an audio input portion 2303, a display device 2304, an operation switch 2305, and an antenna 2306. When the present invention is applied to the display device 2304, a display monitor having excellent visibility can be mounted.

FIG. 11E shows a video camera which is constituted by a main body 2401, a display device 2402, an audio input portion 2403, an operation switch 2404, a battery 2405, and an image receiving portion 2406. When the present invention is applied to the display device 2402, display performance which enables satisfactory photographing in the open air, can be realized.

FIG. 11F shows a rear type projector which is constituted by a main body 2501, a light source 2502, a display device 2503, a polarization beam splitter 2504, reflectors 2505 and 2506, and a screen 2507. When the reflection type LCD of the present invention is applied to the display device 2402, it is possible to thin the device and to obtain fine picture images.

As shown in FIGS. 11A, 11B, 11D and 11E, when a direct viewing display is used, it is effective to form unevenness on the surface of a pixel electrode. By this, a scattering effect of light is increased, so that an angle of visual field, and visibility are improved. On the contrary, in the case of a projection type display as shown in FIGS. 11C and 11F, it is preferable to make the surface of a pixer electrode a mirror surface state. By this, diffused reflection of light is lowered, and color shift and lowering of resolution can be suppressed.

As described above, the scope of application of the present invention is extremely wide, and can be applied to a display medium of any field. When a liquid crystal display device is used for a projection type display device such as a projector, extremely high resolution is required. In such a case, the present invention is an extremely effective technique.

A portable information terminal device typified by a mobile computer, a portable telephone, and a video camera are required to be miniaturized and to have lower consumed power. In such a case, the reflection type LCD of the present invention which does not require backlight, is effective.

As described above, the liquid crystal display device using the present invention has such a structure that gaps between respective pixel electrodes (breaks between pixels) arranged in matrix are filled with embedded insulation layers. At this time, since the surfaces of the pixel electrodes are almost coincident with the surfaces of the embedded insulating layers in level, the portions formed at the gaps between the pixel electrodes, which could be a difference in level, are almost completely flattened.

Thus, the present invention can solve the various problems such as poor orientation of liquid crystal material due to a difference in level, and lowering of contrast due to the diffused reflection of incident light. Besides, since an interlayer insulating film which becomes an under layer of a pixel electrode is flattened in advance, the state of the pixel electrode becomes completely flat.

By the above, it is possible to realize a liquid crystal display device having a high aperture factor, a high reflectivity, and fine display performance.

The entire disclosure of Japanese Patent Application No. 9-123,001 filed on Apr. 25, 1997 including specification, claims, drawings and summary are incorporated herein by reference in its entirety.

What is claimed is:

1. A method of manufacturing a semiconductor device, the method comprising the steps of:

flattening a first insulating film formed on a substrate having an insulating surface;

forming a plurality of electrodes on the insulating film;

forming a second insulating layer comprising an organic resin including black dye or carbon black covering the plurality of electrodes; and flattening the surfaces of the plurality of electrodes and the surface of the second insulating layer so that both of the surfaces form a same plane, and boundary portions of the plurality of electrodes are filled with the second insulating layer;

wherein the flattening step is carried out with a precision of not larger than 20% of a thickness of the electrodes;

wherein portions of the second insulating layer disposed in gaps between the adjacent electrodes function as a black matrix.

2. A method of manufacturing a semiconductor device including at least a first substrate, a transparent second substrate, and a liquid crystal layer held between the first substrate and the second substrate, the method comprising the steps of:

flattening a first insulating film formed on the first substrate;

forming stripe-shaped electrodes on the first insulating film;

forming a second insulating layer comprising an organic resin including a black dye or carbon black covering the stripe-shaped electrodes; and flattening the surfaces of the stripe-shaped electrodes and the surface of the second insulating layer so that both of the surfaces form a same plane, and boundary portions of the stripe-shape electrodes are filled with the second insulating layer;

wherein the flattening step is carried out with a precision of not larger than 20% of a thickness of the electrodes.

3. A method of manufacturing a semiconductor device comprising the steps of:

forming a plurality of semiconductor elements on a substrate having an insulating surface;

forming a first interlayer insulating film;

flattening the first interlayer insulating film;

forming pixel electrodes electrically connected to the semiconductor elements on the first interlayer insulating film;

forming a second insulating layer comprising an organic resin including black dye or carbon black covering the pixel electrodes; and flattening the surfaces of the pixel electrodes and the surface of the second insulating layer so that both of the surfaces form a same plane, and boundary portions of the pixel electrodes are filled with the second insulating layer;

wherein the flattening step is carried out with a precision of not larger than 20% of a thickness of the electrodes;

wherein portions of the second insulating layer disposed in gaps between the adjacent electrodes function as a black matrix.

4. A method of manufacturing a semiconductor device including at least a substrate having a plurality of semiconductor elements formed in matrix and a plurality of pixel electrodes respectively connected to the semiconductor elements, and a liquid crystal held on the substrate, the method comprising the steps of:

forming first interlayer insulating film;

flattening the first interlayer insulating film;

forming pixel electrodes electrically connected to the semiconductor elements on the first interlayer insulating film;

forming a second insulating layer comprising an organic resin including black dye or carbon black covering the pixel electrodes; and flattening the surfaces of the pixel electrodes and the surface of the second insulating layer so that both of the surfaces form a same plane, and boundary portions of the pixel electrodes are filled with the second insulating layer;

wherein the flattening step is carried out with a precision of not larger than 20% of a thickness of the electrodes;

wherein portions of the second insulating layer disposed in gaps between the adjacent electrodes function as a black matrix.

5. A method of manufacturing a semiconductor device as claimed in any one of claims 1 to 4, wherein the flattening step is carried out by mechanical polishing.

6. A method of manufacturing a semiconductor device as claimed in any one of claims 1 to 4, wherein the insulating layer has a light shading property.

7. The method according to any one of claims 1 to 4, wherein the pixel electrode is a reflective electrode.

8. A method of manufacturing a display device comprising:

forming a plurality of switching elements over a substrate having an insulating surface;

forming an interlayer insulating film comprising organic resin over said plurality of switching elements;

leveling a surface of the interlayer insulating film by chemical mechanical polishing;

forming a plurality of transparent pixel electrodes on said interlayer insulating film;

forming an insulating layer comprising an organic resin including black dye or carbon black over said plurality of pixel electrodes to fill gaps of said pixel electrodes with said insulating layer;

leveling a surface of at least the insulating layer by chemical mechanical polishing in order that an upper surface of the insulating layer in said gaps is flush with an upper surface of said pixel electrode.

9. The method according to claim 8 wherein each of said switching elements is a thin film transistor.

10. The method according to claim 8 wherein each of said switching elements is a thin film diode.

11. The method according to claim 8 wherein each of said switching elements is a MIM element.

12. The method according to claim 8, wherein the flattening step is carried out with a precision of not larger than 20% of a thickness of the pixel electrode.

13. The method according to claim 8, wherein the plurality of transparent pixel electrodes comprise ITO or $SnO_2$.

14. A method of manufacturing a display device comprising:

forming a plurality of switching elements on a silicon wafer;

forming an interlayer insulating film comprising organic resin over said plurality of switching elements;

leveling a surface of the interlayer insulating film by chemical mechanical polishing;

forming a plurality of pixel electrodes on said interlayer insulating film; and forming an insulating layer comprising an organic resin including black dye or carbon black over said plurality of pixel electrodes to fill gaps of said pixel electrodes with said insulating layer;

leveling a surface of at least the insulating layer by chemical mechanical polishing in order that an upper surface of the insulating layer in said gaps is flush with an upper surface of said pixel electrode.

15. The method according to claim 14 wherein each of said switching elements is an IGFET.

16. The method according to claim 14, wherein the pixel electrode is a reflective electrode, and wherein the flattening step is carried out with a precision of not larger than 20% of a thickness of the pixel electrode.

17. A method of manufacturing a display device comprising:

forming a plurality of switching elements over a substrate having an insulating surface;

forming an interlayer insulating film comprising organic resin over said plurality of switching elements;

leveling a surface of the interlayer insulating film by chemical mechanical polishing;

forming a plurality of pixel electrodes on said interlayer insulating film; and forming an insulating layer comprising an organic resin including black dye or carbon black over said plurality of pixel electrodes to fill gaps of said pixel electrodes with said insulating layer;

leveling a surface of at least the insulating layer by chemical mechanical polishing in order that an upper surface of the insulating layer in said gaps is flush with an upper surface of said pixel electrode.

18. The method according to claim 17 wherein each of said switching elements is a thin film transistor.

19. The method according to claim 17 wherein each of said switching elements is a thin film diode.

20. The method according to claim 17 wherein each of said switching elements is a MIM element.

21. The method according to claim 17, wherein the pixel electrode is a replaced reflective electrode, and wherein the flattening step is carried out with a precision of not larger than 20% of a thickness of the pixel electrode.

* * * * *